Jan. 10, 1967     H. G. MUHLBAUER ETAL     3,297,700
COMBINATION PROCESS FOR PRODUCING PIPERAZINE
AND N-AMINOETHYLPIPERAZINE
Filed Jan. 16, 1964

INVENTORS.
HERBERT G. MUHLBAUER,
MYRL LICHTENWALTER,
BY *Carl G. Ries*

ATTORNEY.

3,297,700
COMBINATION PROCESS FOR PRODUCING PIPERAZINE AND N-AMINOETHYLPIPERAZINE

Herbert G. Muhlbauer and Myrl Lichtenwalter, Austin, Tex., assignors to Jefferson Chemical Company, Inc., Houston, Tex., a corporation of Delaware
Filed Jan. 16, 1964, Ser. No. 338,201
3 Claims. (Cl. 260—268)

This invention relates to a combination process for the production of a plurality of products from a single feed stock. More particularly, this invention relates to an improved process for the production of piperazine and N-aminoethylpiperazine, both in pure form from ethylene glycol or an aliphatic ethylenic amine.

Reductive amination processes directed to the production of a single heterocyclic amine, namely, piperazine, are disclosed, for example, in MacKenzie U.S. Patent No. 2,861,995, Herrick U.S. Patent No. 2,937,176 and Moss et al. U.S. Patent No. 3,037,023.

As demonstrated by the foregoing and similar publications, comparatively severe catalytic reductive amination reaction conditions are used in order to improve the yield of piperazine. However, cyclizing catalytic reductive amination reactions of this nature are notoriously non-selective. Thus, a wide variety of side reactions normally occur, including cracking reactions and condensation reactions that lead ultimately to the formation of a wide variety of either acyclic or heterocyclic by-products. Thus, piperazine will normally appear in the liquid amine products of the reaction in an amount varying from as little as 5% up to not more than about 40% or 50%. Moreover, the impurities or by-products formed by such side reactions have chemical and physical properties closely related to the properties of the desired product whereby purification of the piperazine is extremely difficult. Thus, side reaction by-products frequently boil in approximately the same boiling range as the desired product and therefore the desired product is recovered by distillation only with difficulty.

Moreover, higher boiling by-products such as N-aminoethylpiperazines are still more difficult to recover because of the increasing complexity of the reaction products both with respect to the number of compounds present and the similarity between freezing points and other physical characteristics.

In contrast to the foregoing, a combination process has been discovered which, surprisingly, gives improved yields of purified piperazine and N-aminoethylpiperazine, and permits the overall selectivity to desired products to be significantly enhanced to provide from about 50% to 75% of the theoretical yield.

The process of the present invention may be described briefly as a process wherein an ethylenic feed stock, as hereafter defined, is contacted with a hydrogenation catalyst in a reaction zone under reaction conditions of elevated temperature and pressure sufficient to bring about cyclization and the formation of piperazine; wherein by-products, including N-aminoethylpiperazine, will be formed; wherein the total product from said reductive amination reaction zone is fractionated in a fractional distillation zone into a purified piperazine fraction, a heavy distillate fraction and a broad boiling-range residue fraction boiling above about 180°; wherein said broad boiling-range residue fraction is further fractionated into a second feed stock fraction boiling within the range of about 180° to about 250° C. and a second heavy residue fraction; and wherein said second feed stock fraction is thereafter subjected to reductive amination in the presence of the same catalyst employed in the said reductive amination reaction zone to produce simultaneously additional piperazine and substantially pure N-aminoethylpiperazine. Thus, in accordance with the present invention, the second feed stock is brought into contact with a hydrogenation catalyst of the class hereafter described under a particular set of reaction conditions which are less severe than those initially employed to give the first piperazine-containing reaction product.

Fresh feed stocks

The fresh feed stock for the present invention should comprise a compound or a mixture of two or more compounds having the formula:

$$X-CH_2-CH_2-Y$$

wherein:

X represents —OH or —NH$_2$;
Y represents X or —(NH—CH$_2$—CH$_2$)$_n$—X; and
$n$ is an integer of 1 to 3.

Specific examples of feed stocks falling within the above definition include ethylene glycol, ethanolamine, diethanolamine, aminoethylethanolamine, ethylenediamine, diethylenetriamine, triethylenetetramine, tetraethylenepentamine, etc., or mixtures thereof.

Suitable catalysts for the reductive amination of the fresh feed stock

A large number of hydrogenation catalysts may be employed for the amination process. Such catalysts will normally be solid metalliferous catalysts containing one or more of the metals from the group including copper, nickel, cobalt, platinum, palladium and rhodium, or oxides thereof. Metal oxides from this group, as employed in the reaction, will normally be reduced to metallic form during the course of the reductive amination. Also, if desired, a promoting amount (e.g., 0.5–10 wt. percent) of a normally non-reducible metal oxide may also be utilized; such non-reducible metal oxide being selected from the group consisting of chromium oxide, molybdenum oxide, manganese oxide and thorium oxide. The preferred catalysts, that is, those which are most effective for the reaction, are selected from the group consisting of the metals copper, nickel and cobalt, and oxides thereof. The catalyst may be prepared as a mixture of oxides as, for example, nickel oxide-copper oxide-chromium oxide. This catalyst in reduced, active form may consist of copper and nickel in combination with chromium oxide.

The catalyst may be carried on an inert support, if desired, such as silica, filtros, alumina, etc.

A particularly effective group of catalysts are those having the composition calculated in mol percent on an oxide-free basis of 60% to 85% nickel, 14% to 37% copper and 1% to 5% chromium with the preferred composition being 72% to 75% nickel, 20% to 25% copper and 1% to 3% chromium. Catalysts of this nature are disclosed and claimed, for example, in coassigned, copending application Serial No. 34,623 filed June 8, 1960. The reductive amination process may be conducted continuously or batch-wise. In a batch process, the amount of catalysts generally employed is between about 5% to about 20% by weight of the fresh feed stock.

It is necessary to use added hydrogen for the reductive amination reaction. Thus, hydrogen should preferably contribute at least 10 and more preferably from about 20 to about 200 atmospheres partial pressure of the total pressure of the reaction system.

Also, the reductive amination reaction should be conducted in the presence of ammonia (e.g., at least 1, and preferably 2 to 10 mols of ammonia per mol of fresh feed stock).

In addition, it is frequently desirable to use added water in the reductive amination reaction, water preferably being added in an amount from about 1 to 100 wt. percent, based upon the weight of the total normally liquid nonaqueous feed to the reactor.

The reaction conditions to be employed in the reductive amination zone will suitably include a reaction temperature within the range of about 150° to about 400° C. and a contact time corresponding to a feed rate of about 0.1 to 3 pounds of amine feed per hour per pound of catalyst. It will be understood that long contact times will be used at low temperatures and that short contact times will be used at high temperatures. A preferred temperature range is from about 200° to about 300° C. and a preferred contact time corresponds to a feed rate of about 0.4 to about 0.8 pound of amine feed per hour per pound of catalyst. The reaction is suitably run at a pressure from about 30 to about 400 atmospheres, 65 to 225 atmospheres being preferred.

Work-up of reductive amination products

As has been indicated, a wide variety of products will be formed when the feed stock is subjected to reductive amination under the conditions described above. In accordance with the present invention, the total reaction product is worked up in the following manner.

The total reaction product is charged to a distillation zone comprising at least one, but more preferably a plurality of distillation columns. Thus, for example, the total reactor product may be treated first for the selective removal of hydrogen, which is preferably employed for recycle. Next, the reactor product may be treated for the removal of ammonia and at least a portion of the water to provide an aqueous ammonia stream which is also preferably recycled. The remaining normally liquid components are passed to the distillation zone wherein they are fractionated into a first light distillate product comprising water and, in some situations, a minor amount of light reaction by-products. This light distillate fraction is preferably discarded from the system.

The next fraction to be taken is an ethylene-diamine distillate fraction such as a fraction boiling within the range of about 102° to 145° which may be recycled or recovered as a product.

Next, a concentrated piperazine product fraction boiling within the range of 145° to 152° C. is obtained.

The next fraction to be taken is a monoethanolamine distillate fraction such as a fraction boiling within the range of about 152° to about 180° C. which is preferably recycled to the reaction zone.

The residue, which will comprise a mixture of amines boiling above about 180°, is subjected to a further work-up in accordance with the present invention; this preferably being accomplished in a vacuum distillation zone wherein the first residue fraction, above described, is split into a second feed stock fraction boiling within the range of about 180° to about 250° C. and a second residue fraction boiling above 250° C. which is preferably discarded from the system.

The second feed stock fraction will normally contain a major amount (i.e., more than 50 wt. percent) of N-aminoethylpiperazine, lesser amounts of diethylenetriamine, aminoethylethanolamine and hydroxyethylpiperazine and minor amounts of other high-boiling amine by-products. However, because of the chemical and physical characteristics of the components of the fraction, purified N-aminoethylpiperazine is obtained from this fraction in good yields by additional distillation only with great difficulty.

In accordance with the present invention, this second feed stock fraction is utilized as a feed stock for a second conversion whereby additional piperazine and substantially pure N-aminoethylpiperazine are obtained.

Production of purified N-aminoethylpiperazine

In accordance with the present invention, the second feed stock, as above described, is again subjected to reductive amination under controlled conditions which are milder than those employed for the initial reductive amination reaction described above. Thus, the milder conditions may include the reductive amination conditions set forth above except for the use of a more restricted lower temperature within the range of about 180° to about 220° C. and a contact time corresponding to a feed rate of about 0.4 to about 0.8 pound of amine feed per hour per pound of catalyst. As another example, the milder conditions may include the reductive amination conditions described above except that the contact time may correspond to an amide feed rate of from about 0.8 to about 1.6 pounds of amine feed per hour per pound of catalyst at a temperature within the range of 200° to 300° C. As a further example, the milder reaction conditions may include both a change in temperature and a change in contact time to provide for reductive amination at a temperature within the range of about 180° to about 220° C. and a contact time corresponding to an amine feed rate of about 0.8 to about 1.6 pounds of amine feed per hour per pound of catalyst. As a consequence, a liquid amine product will be obtained which will contain a major amount of N-aminoethylpiperazine and some piperazine.

The present invention will be further illustrated with respect to the accompanying drawing wherein the single figure is a schematic flow sheet illustrating the preferred method for the continuous practice of the present invention. In the drawing, equipment is shown schematically and ancillary features such as valves, pumps, heaters, coolers, reflux equipment, reboiler equipment, flow controls, etc., have not been shown since these items are familiar to those skilled in the art and do not form a part of the present invention.

Turning now to the drawing, there is shown schematically a first reaction zone 10 to which a fresh feed stock of the present invention is charged by way of a charge line 12 controlled by valve 14. While any suitable ethyleneamine feed stock, as above described, may be utilized, a preferred feed stock is monoethanolamine and the drawing will be described with respect to this feed stock.

The reactor 10, in accordance with this embodiment of the present invention, will contain a fixed bed of a solid hydrogenation catalyst, as above described, such as a pelleted catalyst composed of the metals or oxides of nickel, copper and chromium and containing, on an oxide-free basis, about 75 mol percent nickel, about 23 mol percent copper and about 2 mol percent chromium. Preferably, the pelleted catalyst is a catalyst which has been prereduced with hydrogen whereby the nickel and copper are at least partially present in metallic form and whereby the chromium is present as chromium oxide.

The ethanolamine and recycle fractions, if any, will be passed into reactor 10 by way of charge line 12 at an amine feed stock charge rate which is preferably within the range of about 0.4 to about 0.8 pound of total amine feed stock per hour per pound of catalyst.

The monoethanolamine is preferably brought into contact with the hydrogenation catalyst in the presence of hydrogen and ammonia. Hydrogen may be initially added by way of a charge line 16 controlled by a valve 18 in amounts sufficient to provide at least 10, and more preferably from about 100 to about 200 atmospheres of hydrogen. Ammonia may be charged initially by way of a charge line 20 controlled by a valve 22 in an amount sufficient to provide at least 1 and more preferably from about 2 to about 15 mols of ammonia per mol of monoethanolamine. Water is also preferably charged to the reaction zone 10; water, for example, being charged initially by way of a water charge line 24, controlled by a valve 26, leading to the ethanolamine charge line 12. The amount of water added initially will be such that the reaction mixture contains from about 1 to about 50 wt. percent of water, based on the weight of the total liquid feed to the reactor.

Within reaction zone 10, reaction conditions will preferably include a temperature within the range of about 200° to about 300° C. and a pressure within the range of about 100 to about 200 atmospheres. As a consequence, at least a portion of the monoethanolamine is converted to a variety of amine products, including light cracked products, ethylenediamine, piperazine, N-aminoethylpiperazine, N-methylpiperazine, N-ethylpiperazine, N-hydroxyethylpiperazine, diethylenetriamine, etc.

The total products are discharged from reaction zone 10 by way of a line 28 leading to a stripping zone comprising a first stripper 30 wherein hydrogen is stripped overhead from the total reaction product by way of line 32 which preferably recycles to the hydrogen charge line 16, whereby hydrogen is added on a lined-out basis only at a replacement rate. The bottoms from the first stripper 39 are discharged by way of a line 34 leading to a second stripper 36 wherein at least some of the water and the ammonia are removed overhead by way of a line 38 which preferably recycles to the ammonia charge line 20 whereby, on a lined-out basis, ammonia and water are added by way of charge lines 20 and 24 only at replacement rates.

The bottoms of the second stripper 36 are discharged by way of a line 40 leading to a distillation zone 42 which is shown schematically in the drawing as a single distillation tower. It will be understood that in actual practice, zone 42 will comprise a plurality of distillation towers such as a plurality of splitter towers equipped with appropriate reboilers, reboiler lines, reflux condensers, reflux lines, etc., in order to achieve effective distillation. Zone 42 is shown schematically since equipment necessary for the operation of the zone 42 is commercially available and does not constitute a part of the present invention. Although any type of distillation may be employed, the distillation equipment in zone 42 is preferably distillation equipment designed for simple atmospheric pressure operations.

Within the distillation zone 42, the reaction products are separated into a light overhead water fraction 46 boiling below about 100° C. and containing water, some ammonia and a minor amount of water-azeotroping amines, etc. This fraction is preferably discharged from the system.

A light distillate fraction 48 boiling within the range of about 100° to 145° C. is preferably taken and charged as recycle to reactor 10, line 48 preferably interconnecting with charge line 12 for the fresh feed stock.

A distillate fraction 50 boiling within the range of about 145° to about 150° C. and consisting essentially of piperazine is taken as product. When distillation is accompished in accordance with the sequence described, this fraction will comprise about 95 wt. percent or more of piperazine and is frequently useful, as obtained, for commercial applications.

A heavier recycle distillate fraction 52 boiling within the range of about 150° to about 180° C. is also taken, the recycle fraction 52 preferably being charged to reactor 10 by way of fresh feed charge line 12.

The residue fraction from distillation zone 42 will comprise amines boiling above 180° C. and normally over the range of from about 180° to about 300° C. It is discharged from zone 42 by way of a bottoms line 54 leading to a second distillation zone 56. The distillation zone 56 may suitably comprise a vacuum distillation splitter tower or equivalent type distillation equipment.

Within the zone 56, the residue fraction 54 is split into a second residue fraction 58 boiling above 250° C. which is preferably discarded from the process. The distillate fraction 60 from distillation zone 56 boils within the range of about 180° to about 250° C. and is the second feed stock of the present invention.

The second feed stock 60 is an impure material comprising a mixture of high-boiling amines and normally including about 50 to 75 wt. percent N-aminoethylpiperazine, the remainder comprising diethylenetriamine, aminoethylethanolamine, hydroxyethylpiperazine and other related materials.

Because of its low purity, the second feed stock 60 has only marginal value. Moreover, it is difficult to recover purified N-aminoethylpiperazine in good yields from this fraction because of the physical and chemical characteristics of these compounds and of the impurities associated therewith.

In accordance with the present invention, however, it has been discovered that purified N-aminoethylpiperazine can be obtained from this fraction together with significant amounts of piperazine when the second feed stock is contacted with a hydrogenation catalyst, as above described, such as the catalyst employed in reactor 10 at a temperature within the range of about 180° to about 220° C. or a space velocity of about 0.8 to about 1.6 pounds of feed per hour per pound of catalyst, or both, under conditions otherwise the same as those normally employed in reaction zone 10, including a superatmospheric pressure and the use of added water, hydrogen and ammonia.

Accordingly, by way of example, the second feed stock 60 may be charged to a manifold 62 and from thence by way of a branch line 64 controlled by a valve 66 to a stock tank 68 for accumulation. When a sufficient quantity of the second feed stock 60 has been accumulated in stock tank 68, valve 14 in the fresh feed line 12 may be closed and the second feed stock may be discharged from stock tank 68 by way of a branch line 70 controlled by a valve 72 leading to charge line 12 for reactor 10. Thereafter, the temperature or space velocity or both within the reactor 10 may be adjusted in the described manner whereby the products formed in the reaction zone 10 on conversion of the second feed stock 60 will be processed and worked up in the manner above for the processing and working-up of the ethanolamine reaction product. Again, piperazine will be obtained as a product by way of a line 50. The fractions 46, 48, 52 and 54 will be obtained and disposed of or further treated in the described manner. However, in this instance, the distillate fraction 60 from the second distillation zone 56 will consist of about 90 wt. percent or more of N-aminoethylpiperazine. Accordingly, the distillate 60 after being charged to the manifold 62 may be discharged therefrom by way of a product line 74 controlled by valve 76. It will be understood that in this situation the valve 66 in line 64 will be closed.

*Operation*

By way of a specific example of the operation of the present invention, the fresh feed stock added by way of line 12 may be monoethanolamine, and the catalyst in reactor 10 may be a nickel, copper, chromium oxide catalyst containing 75 mol percent nickel, 23 mol percent copper and 2 mol percent chromium on an oxide-free basis.

In a lined-out operation, fresh ethanolamine charged by way of line 12 and recycle fractions 48 and 52 may be charged to reaction zone 10, together with added ammonia, hydrogen and water.

In this situation, the reaction products in the line 28 will comprise hydrogen, ammonia, water (in a major amount), ethylenediamine, monoethanolamine, piperazine, diethylenetriamine, N-aminoethylpiperazine, N-aminoethylethanolamine, N-hydroxyethylpiperazine and heavier amine by-products.

In this situation, the recycle fraction 48 will consist essentially of ethylenediamine and water while the recycle fraction 52 will be composed primarily of unconverted monoethanolamine.

Also in this situation, the second feed stock 60 taken as distillate from distillation zone 56 will comprise about 50 to 75 wt. percent of N-aminoethylpiperazine, diethylenetriamine, N-aminoethylethanolamine, N-hydroxyethylpiperazine and a minor amount of mixed heavy amines boiling in the indicated range.

In accordance with the embodiment of the present invention wherein the distillate fraction 60 is accumulated in stock tank 68 and then rerun through reaction zone 10, the following results have been observed. A first rerun was made under reaction conditions including a pressure of about 2,900 p.s.i.g. and a hydrogen charge rate of about 1.3 s.c.f.h. per pound of amine. The feed stock also contained about 15 wt. percent of ammonia and about 40 wt. percent of water, the balance being second feed stock 60.

In a first rerun operation, the temperature was maintained at about 195° to about 203° C. (run "A"), while in a second rerun, the temperature was maintained at about 220° to about 245° C. (rerun "B").

The composition and yield of the rerun fraction obtained by way of line 60 from distillation zone 56 are set forth in Table 1.

TABLE 1

|  | "A" | "B" |
|---|---|---|
| Reactor temperature, ° C | 195–203 | 222–245 |
| Yields, percent (based on second feed to reactor): |  |  |
| Piperazine fraction 50 | 11.6 | 11.7 |
| Ethylenediamine and N-alkylpiperazine | 6.5 | 18.8 |
| Fraction 60 | 62.9 | 14.8 |
| Fraction 58 | 18.0 | 34.9 |
| Pyrolysis (losses) | 0 | 19.0 |
| Concentration of N-aminoethylpiperazine in fraction 60 | 91.5 | 60 |

It will be observed that in run "A," conducted in accordance with the present invention, the rerun fraction 60 contained about 91.5 wt. percent of N-aminoethylpiperazine, while an 11.6% yield of piperazine fraction 50 was produced. The other significant fraction was about 18% yield of material boiling above about 250° C. (fraction 58).

In contrast, in run "B," there was no increase in the yield of piperazine, but a significant decrease in the yield of N-aminoethylpiperazine. Moreover, the residue fraction 58 constituted about 35 wt. percent of the total reaction mixture and the N-alkylpiperazines were formed in an amount greater than the amount of N-aminoethylpiperazine. Also, there were significant pyrolysis losses.

From this it is seen that a rerun operation conducted in accordance with the present invention provides an effective means for the simultaneous production of piperazine and N-aminoethylpiperazine.

In representative runs made in this fashion, it has been found that it is possible to obtain about 0.4 pound of N-aminoethylpiperazine per pound of piperazine product and only about 0.85 pound of residue 58 per pound of piperazine product.

What is claimed is:

1. In a method which comprises the steps of bringing an amine feed stock into contact with a hydrogenation catalyst in a primary reaction zone in the presence of hydrogen and from about two to about ten mols of ammonia per mol of amine feed stock under conditions of temperature and pressure sufficient to cyclize at least a portion of said feed stock to form piperazine, whereby a reaction product is formed comprising an amine mixture, the improvement which comprises:

(A) Separating said reaction product in a first separation zone into at least a piperazine fraction and a substantially piperazine-free distillate second feed stock fraction boiling within the range of about 180° to about 250° C. and comprising N-aminoethylpiperazine, (B) Separately bringing said second feed stock into contact with a hydrogenation catalyst in a reaction zone under conversion conditions less severe than those employed in said primary reaction zone to convert the second feed stock into a second reaction product comprising piperazine and N-aminoethylpiperazine, (C) Separating said second reaction product in a second separation zone into a crude piperazine fraction and a product N-aminoethylpiperazine distillate fraction boiling within the range of about 180° to about 250° C. consisting essentially of N-aminoethylpiperazine, (D) Recycling said crude piperazine fraction to said first separation zone, and (E) Recovering said product N-aminoethylpiperazine distillate fraction, (F) Said amine feed stock comprising a compound having the formula:

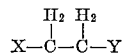

wherein X is selected from the group consisting of —OH and —NH$_2$, and Y is selected from the group consisting of X and

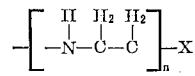

wherein $n$ is an integer of 1 to 3, (G) Said conversion conditions in said primary reaction zone including a temperature within the range of about 200° to about 300° C., a pressure within the range of about 30 to about 400 atmospheres including a hydrogen partial pressure of at least ten atmospheres and a contact time corresponding to a feed rate of about 0.1 to about three pounds of said amine feed stock per hour per pound of hydrogenation catalyst, (H) Said less severe conversion conditions including a temperature within the range of 180° to 220° C. and a contact time corresponding to a feed rate of 0.4 to about 1.6 pounds of said second feed stock per hour per pound of catalyst.

2. In a method which comprises the steps of bringing a monoethanolamine into contact with a hydrogenation catalyst in a primary reaction zone in the presence of hydrogen and from about two to about ten mols of ammonia per mol of amine feed stock under conditions of temperature and pressure sufficient to cyclize at least a portion of said feed stock to form piperazine, whereby a reaction product is formed comprising an amine mixture, the improvement which comprises:

(A) Separating said reaction product in a first separation zone into at least a piperazine product fraction and a second substantially piperazine-free distillate feed stock fraction boiling within the range of about 180° to about 250° C. and comprising N-aminoethylpiperazine, (B) Separately bringing said second feed stock into contact with a hydrogenation catalyst in a second reaction zone under conversion conditions less severe than those employed in said primary reaction zone to convert the second feed stock into a second reaction product comprising piperazine and N-aminoethylpiperazine, (C) Separating said second reaction product in a second separation zone into a crude piperazine fraction and a product N-aminoethylpiperazine distillate fraction boiling within the range of about 180° to about 250° C. consisting essentially of N-aminoethylpiperazine, (D) Recycling said crude piperazine fraction to said first separation zone, and (E) Recovering said product N-aminoethylpiperazine distillate fraction, (F) Said conversion conditions in said primary reaction zone including a temperature within the range of about 200° to about 300° C., a pressure within the range of about 30 to about 400 atmospheres, including a hydrogen partial pressure of at least ten atmospheres and a contact time corresponding to a feed rate of about 0.1 to about three pounds of said amine feed stock per hour per pound of hydrogenation catalyst, (G) Said less severe conversion conditions and said second reaction zone including a temperature within the range of 180° to 220° C. and a contact time corresponding to a feed rate of 0.4 to about 1.6 pounds of said second feed stock per hour per pound of catalyst.

3. In a method which comprises the steps of bringing a monoethanolamine into contact with a hydrogenation catalyst in a primary reaction zone in the presence of hydrogen and from about two to about ten mols of ammonia per mol of amine feedstock under conditions of temperature and pressure sufficient to cyclize at least a portion of said feedstock to form piperazine, whereby a reaction product is formed comprising an amine mixture, the improvement which comprises:

(A) Separating said reaction product in a first separation zone into at least a piperazine product fraction and a second substantially piperazine-free distillate feedstock fraction boiling within the range of about 180° to about 250° C. and comprising N-aminoethylpiperazine, (B) Separately bringing said second feedstock into contact with a hydrogenation catalyst in a second reaction zone under conversion conditions less severe than those employed in said primary reaction zone to convert the second feedstock into a second reaction product comprising piperazine and N-aminoethylpiperazine, (C) Separating said second reaction product in a second separation zone into a crude piperazine fraction and a product N-aminoethylpiperazine distillate fraction boiling within the range of about 180° to about 250° C. consisting essentially of N-aminoethylpiperazine, (D) Recycling said crude piperazine fraction to said first separation zone, and (E) Recovering said product N-aminoethylpiperazine distillate fraction, (F) Said conversion conditions in said primary reaction zone including a temperature within the range of about 200° to about 300° C., a pressure within the range of about 65 to about 225 atmospheres, including a hydrogen partial pressure of at least ten atmospheres and a contact time corresponding to a feed rate of about 0.4 to about 0.8 pound of said amine feedstock per hour per pound of hydrogenation catalyst, (G) Said less severe conversion conditions in said second reaction zone including a temperature within the range of from about 180° to about 220° C. and a contact time corresponding to a feed rate of about 0.8 to about 1.6 pounds of said second feedstock per hour per pound of catalyst, (H) Said hydrogenation catalyst consisting of copper, nickel and chromium oxide having the composition, calculated in mol percent on an oxide-free basis, of 60% to 85% nickel, 14% to 37% copper and 1% to 5% chromium.

References Cited by the Examiner

UNITED STATES PATENTS

| | | | |
|---|---|---|---|
| 3,055,901 | 9/1962 | Speranza et al. | 260—268 |
| 3,112,318 | 11/1963 | Lemon et al. | 260—268 |
| 3,151,115 | 9/1964 | Moss et al. | 260—268 |

ALEX MAZEL, *Primary Examiner.*

J. W. ADAMS, JR., H. JILES, *Assistant Examiners.*